No. 760,718. PATENTED MAY 24, 1904.
R. WOODMAN.
LOCK STUB FOR SALE CHECKS.
APPLICATION FILED JUNE 1, 1903.
NO MODEL.

Witnesses:
William H. Forrest.
Albert G. Slaney.

Inventor:
Robert Woodman.
By his Attorney,
Charles L. Gooding.

No. 760,718.                                         Patented May 24, 1904.

UNITED STATES PATENT OFFICE.

ROBERT WOODMAN, OF MALDEN, MASSACHUSETTS.

LOCK-STUB FOR SALE-CHECKS.

SPECIFICATION forming part of Letters Patent No. 760,718, dated May 24, 1904.

Application filed June 1, 1903. Serial No. 169,489. (No model.)

*To all whom it may concern:*

Be it known that I, ROBERT WOODMAN, a citizen of the United States, residing at Malden, in the county of Middlesex and State of Massachusetts, have invented new and useful Improvements in Lock-Stubs for Sale-Checks, of which the following is a specification.

The object of this invention is to provide a simple, durable, and convenient device for locking sale-checks to a casing in such a manner that the stubs of the checks cannot be removed without proper key to unlock the device.

The object is, further, to provide a device of the character hereinbefore described which is adjustable to different numbers of checks.

The invention consists in a device of the character described of a casing with a spindle located in the interior thereof, having a rack thereon and a lock constructed to slide longitudinally of said spindle and engaging said rack.

The invention again consists in a device of the character described of a casing, a spindle located in said casing and provided with a rack along its length, the top of the casing being movable and constructed to slide along said spindle and having a lock fast thereto and engaging said rack.

The invention finally consists in the combination and arrangement of parts set forth in the following specification, and particularly pointed out in the claim thereof.

Figure 1:
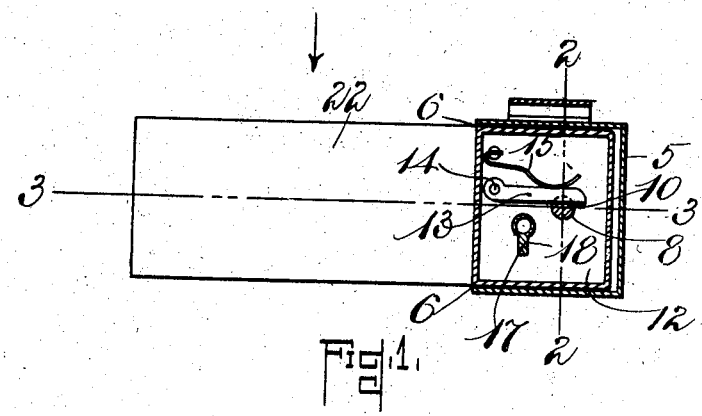
Figure 2:
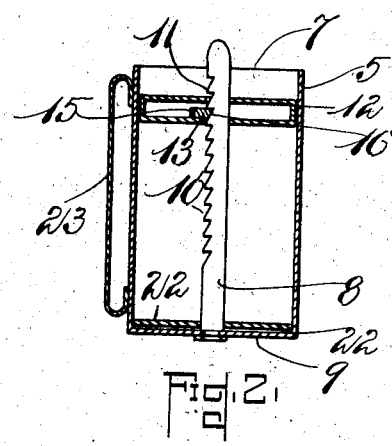
Figure 3:
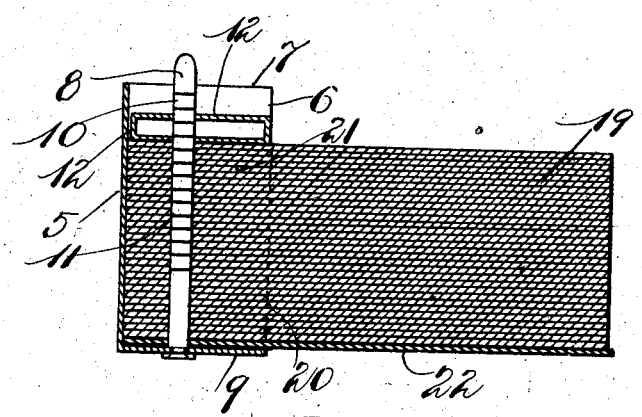

Referring to the drawings, Figure 1 is a horizontal section illustrating my improved lock-stub. Fig. 2 is a vertical section, partly in elevation, taken on the line 2 2 of Fig. 1 looking toward the right in said figure. Fig. 3 is a section, partly in elevation, taken on line 3 3 of Fig. 1 looking in the direction of the arrow in said figure.

Like numerals refer to like parts throughout the several views of the drawings.

In the drawings, 5 is a casing having an open side 6 and top 7. A spindle 8 is riveted to the bottom 9 of said casing and extends upwardly from the bottom 9 in the interior of the casing. Said spindle is provided with a rack 10, the teeth 11 of said rack being preferably ratchet-teeth. A top 12 is provided constituting a lock-case constructed to slide in the casing 5 and upon the spindle 8. Said lock may be constructed in any desirable manner; but, as shown, a lever 13 is pivoted at 14 to the lock-casing 12 and is held against the teeth of the rack 10 by a spring 15. The lever 13 is beveled on the side 16 in contact with the teeth 11 to fit said teeth.

It will be seen that by pushing downwardly upon the lock-top 12 the lock-lever 13 will pass over the teeth, the spring 15 yielding to allow of said movement. To move the lock-top 12 upwardly, a key 17 is inserted in the keyhole 18, provided in said lock-top, and turned so as to move the lever 13 out of contact with the teeth 11, whereupon the lock-top 12 may be raised for the purpose of allowing new checks to be inserted.

The checks 19 are preferably of the usual form, made of cardboard and perforated at 20 to allow the main body of the checks to be torn from the stubs 21. The stubs of the checks are perforated to allow the spindle 8 to be passed through said holes and lock the checks to the casing 5. The checks 19 rest upon a loose-ticket-supporting plate 22, which has a hole therein, through which the spindle 8 extends.

In practical use the device hereinbefore described is operated as follows: The key 17 is inserted in the keyhole 18 and rotated until it comes in contact with the lock-lever 13, whereupon said lock-lever is raised out of contact with the teeth 11 of the rack 10. The lock-top 12 is then removed from the spindle 8 and the checks 19 placed in the casing, with the spindle 8 extending through the holes therein. The lock-top 12 is then replaced upon the spindle and pressed downwardly until it clamps the checks firmly against the ticket-supporting plate 22. The key 17 is then removed and the device is in condition to be used by the waiter.

In practical use the device hereinbefore described is carried by means of a strap or belt extending through a loop 23 of metal fast to one side of the casing 5.

While I have illustrated and described my improved device as provided with a rack centrally located in the casing, it is evident that said rack may be located at any point inside the walls of said casing without departing from the spirit of my invention.

Having thus described my invention, what I claim, and desire by Letters Patent to secure, is—

In a device of the character described, a rectangular hollow casing consisting of a bottom plate and walls rigidly fastened thereto and provided with an open top and side, a spindle provided with a rack along its length fast to the bottom of said casing and extending upwardly therefrom, a sliding top movable longitudinally of said spindle, a lock fast to said top and engaging said spindle, and a ticket-supporting plate engaging said spindle and projecting from the interior of said casing through said open side.

In testimony whereof I have hereunto set my hand in presence of two subscribing witnesses.

ROBERT WOODMAN.

Witnesses:
CHARLES S. GOODING,
ANNIE J. DAILEY.